(12) United States Patent
Visser

(10) Patent No.: US 11,871,708 B2
(45) Date of Patent: Jan. 16, 2024

(54) PLANT HOLDER, SYSTEM THEREFOR AND METHOD FOR PROCESSING THEREOF

(71) Applicant: VISCON GROUP HOLDING B.V., 's-Gravendeel (NL)

(72) Inventor: Anthony Visser, 's-Gravendeel (NL)

(73) Assignee: VISCON GROUP HOLDING B.V., 's-Gravendeel (NL)

(*) Notice: Subject to any disclaimer, the term of this patent is extended or adjusted under 35 U.S.C. 154(b) by 375 days.

(21) Appl. No.: 16/463,438

(22) PCT Filed: Nov. 27, 2017

(86) PCT No.: PCT/NL2017/050785
§ 371 (c)(1),
(2) Date: May 23, 2019

(87) PCT Pub. No.: WO2018/101818
PCT Pub. Date: Jun. 7, 2018

(65) Prior Publication Data
US 2020/0229354 A1    Jul. 23, 2020

(30) Foreign Application Priority Data

Nov. 30, 2016   (NL) ..................................... 2017897

(51) Int. Cl.
*A01G 2/10*    (2018.01)
*A01G 9/12*    (2006.01)
(Continued)

(52) U.S. Cl.
CPC ................. *A01G 2/10* (2018.02); *A01G 2/38* (2018.02); *A01G 9/083* (2013.01); *A01G 9/128* (2013.01)

(58) Field of Classification Search
CPC ... A01G 1/06; A01G 2/00; A01G 2/10; A01G 2/30; A01G 2/32; A01G 2/35; A01G 2/38;
(Continued)

(56) References Cited

U.S. PATENT DOCUMENTS 2,368,420 A * 1/1945 Masunaga ................. A01G 2/35
47/6
5,320,649 A * 6/1994 Holland ............... A01C 11/025
47/1.01 R
(Continued)

FOREIGN PATENT DOCUMENTS

CN    2370675 Y    3/2000
EP    1459619 A1   9/2004
(Continued)

OTHER PUBLICATIONS

WO 2016/062913 A1 Translation (Year: 2016).*
(Continued)

*Primary Examiner* — David J Parsley
*Assistant Examiner* — Kari A Bradberry
(74) *Attorney, Agent, or Firm* — KDW Firm PLLC

(57) ABSTRACT

A plant holder includes at least one cell which defines a plant position and which is configured to receive plant material during use. A clamp includes a clamping position in which plant material is to be clamped in the cell and an open position in which plant material is to be arranged in and/or removed from the clamp. The clamp is provided with at least one actuator which is configured to be engaged externally in order to open the clamp. A system includes such a plant holder. A method of processing a plant holder including a clamp, includes the steps of: opening the clamp; arranging plant material in the clamp and/or removing it therefrom; and closing the clamp.

3 Claims, 6 Drawing Sheets

(51) Int. Cl.
*A01G 2/38* (2018.01)
*A01G 9/08* (2006.01)

(58) Field of Classification Search
CPC ........ A01G 9/128; A01G 9/083; A01G 9/085;
Y10T 24/44291; F16B 2/10; F16B 2/20
See application file for complete search history.

(56) References Cited

U.S. PATENT DOCUMENTS

| | | | | |
|---|---|---|---|---|
| 2004/0118041 A1* | 6/2004 | Rombouts | ................ | A01G 2/35 47/58.1 CF |
| 2006/0090813 A1* | 5/2006 | Van Der Burg | ....... | A01G 9/088 141/125 |
| 2013/0333600 A1* | 12/2013 | Struijk | ................ | A01G 9/083 111/105 |
| 2017/0094896 A1* | 4/2017 | Van Der Knaap | ..... | A01G 24/44 |

FOREIGN PATENT DOCUMENTS

| | | | | | |
|---|---|---|---|---|---|
| ES | 1156810 U | * | 5/2016 | ............... | A01G 2/32 |
| FR | 2546371 A1 | | 11/1984 | | |
| JP | 2001128551 A | | 5/2001 | | |
| WO | 0052996 A1 | | 9/2000 | | |
| WO | WO-2005089532 A1 | * | 9/2005 | ............... | A01G 2/32 |
| WO | WO-2016062913 A1 | * | 4/2016 | ............... | A01G 2/32 |

OTHER PUBLICATIONS

ES-1156810-U Translation (Year: 2016).*
International Search Report and Written Opinion for the International Patent Application No. PCT/NL2017/050785, dated Feb. 27, 2018, 10 pages.

* cited by examiner

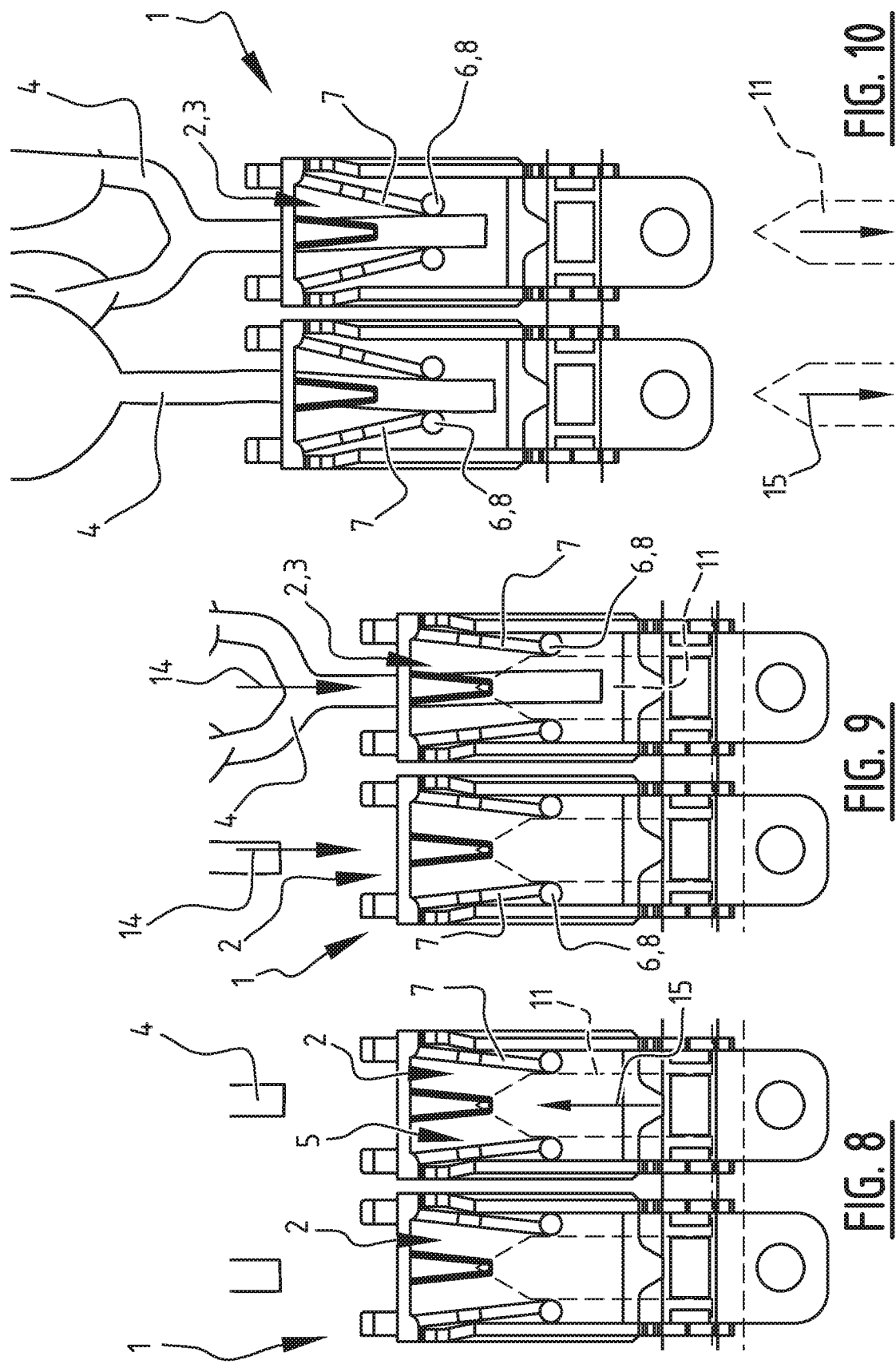

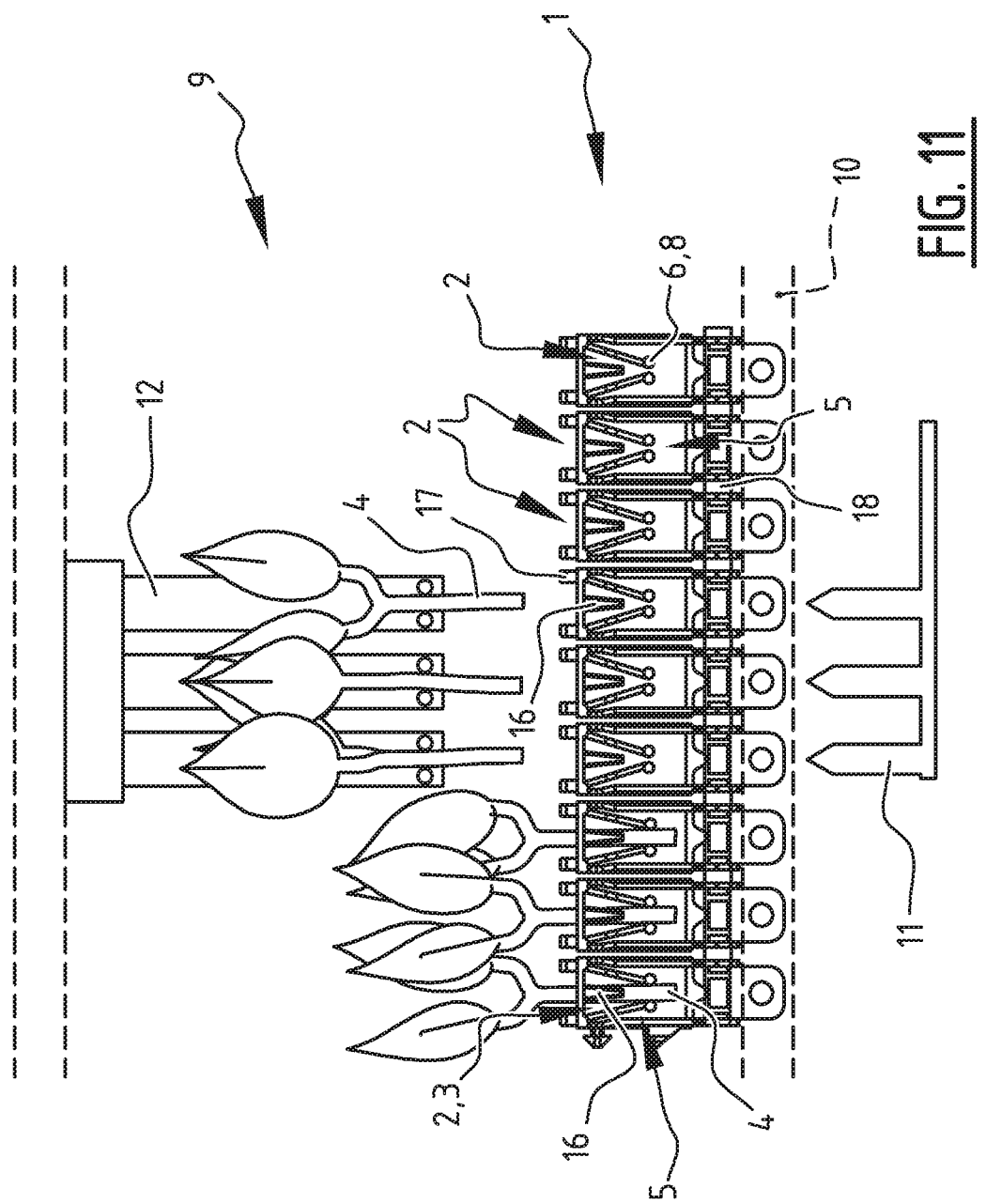

PLANT HOLDER, SYSTEM THEREFOR AND METHOD FOR PROCESSING THEREOF

This is a national stage application filed under 35 U.S.C. § 371 of pending international application PCT/NL2017/050785 filed Nov. 27, 2017, which claims priority to Netherlands patent application be 2017897, filed Nov. 30, 2016, the entirety of which applications are hereby incorporated by reference herein.

The invention relates to a plant holder, to a system comprising such a plant holder, as well as to a method for processing a plant holder.

Taking cuttings is a way of vegetative propagation, wherein the genetic reproductive material remains unchanged. When taking cuttings, parts of an existing plant are cut off and, after treatment, cultivated to fully fledged plants. It is known to cultivate such plant cuttings in holders specially configured for the purpose to a growth stage at which they can be potted in a pot. These cuttings are placed in bags in large numbers, for instance 100 pieces per bag. These bags are packed in boxes and shipped. Such cuttings are frequently transported as air freight from a country with a warm climate to a country with a temperate climate. The cuttings are then taken out of the bags and placed manually in culture pots. Because of the large number of operations, the cutting can be damaged.

An object of the present invention is to provide a plant holder, a system comprising such a plant holder and/or a method for processing of a plant holder, wherein said drawbacks do not occur, or at least do so to lesser extent.

Said object is achieved according to the invention with the plant holder according to the invention, comprising at least one cell which defines a plant position and which is configured to receive plant material during use, a clamp comprising a clamping position in which plant material is to be clamped in the cell and an open position in which plant material is to be arranged in and/or removed from the clamp, and wherein the clamp is provided with at least one actuator which is configured to be engaged externally in order to open the clamp.

Said object is further achieved with the system according to the invention, comprising: a feed of one or more than one plant holder according to the invention, a spreader with which the at least one actuator is engageable in order to open the clamp, and an inserting device and/or removing device which is configured to arrange plant material in or remove it from the clamp.

Said object is further achieved with the method for processing a plant holder comprising a clamp, comprising the following steps of:
 opening the clamp;
 arranging plant material in the clamp and/or removing it therefrom; and
 closing the clamp.

The plant holder comprises a clamp which is provided with at least one actuator which is configured to be engaged externally in order to open the clamp. By actively opening the clamp there is less of an impact on the plant material when it is arranged in or removed from the clamp. Also prevented is that the clamp is fully opened by the plant material to be arranged therein, which would have an impact on the plant material and could damage it. The system according to the invention comprises a spreader with which the at least one actuator is engageable in order to open the clamp. Opening of the clamp can hereby be operated mechanically.

Preferred embodiments of the plant holder, the system and the method are the subject-matter of the dependent claims.

Preferred embodiments of the present invention are further elucidated in the following description with reference to the drawing, in which:

FIGS. 6-10 show successive steps in the arranging of plant material in a clamp of the plant holder;

FIG. 11 is a schematic view of the system according to FIG. 5 in operation.

Figure 1:
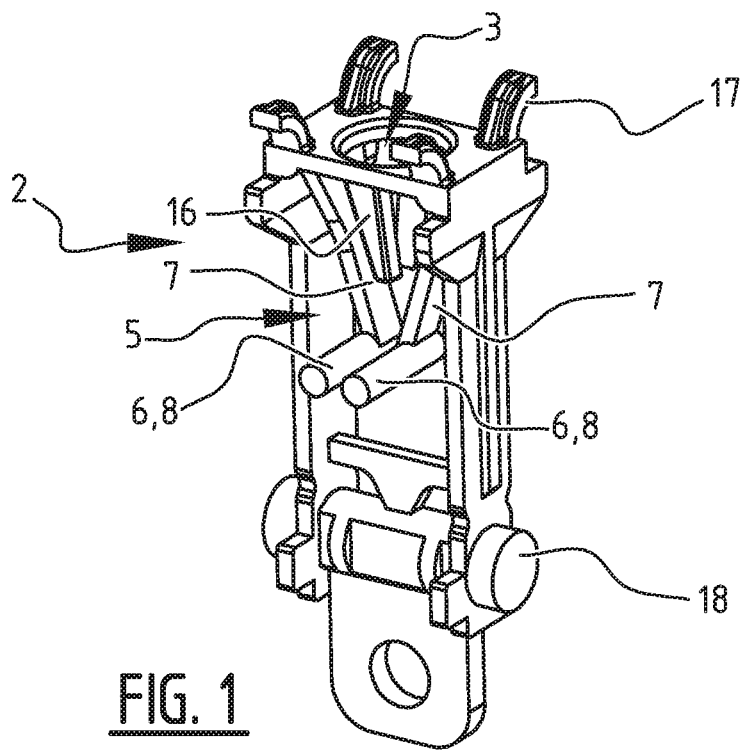
FIG. 1 is a perspective view of a plant holder cell according to the invention.
Figure 2:
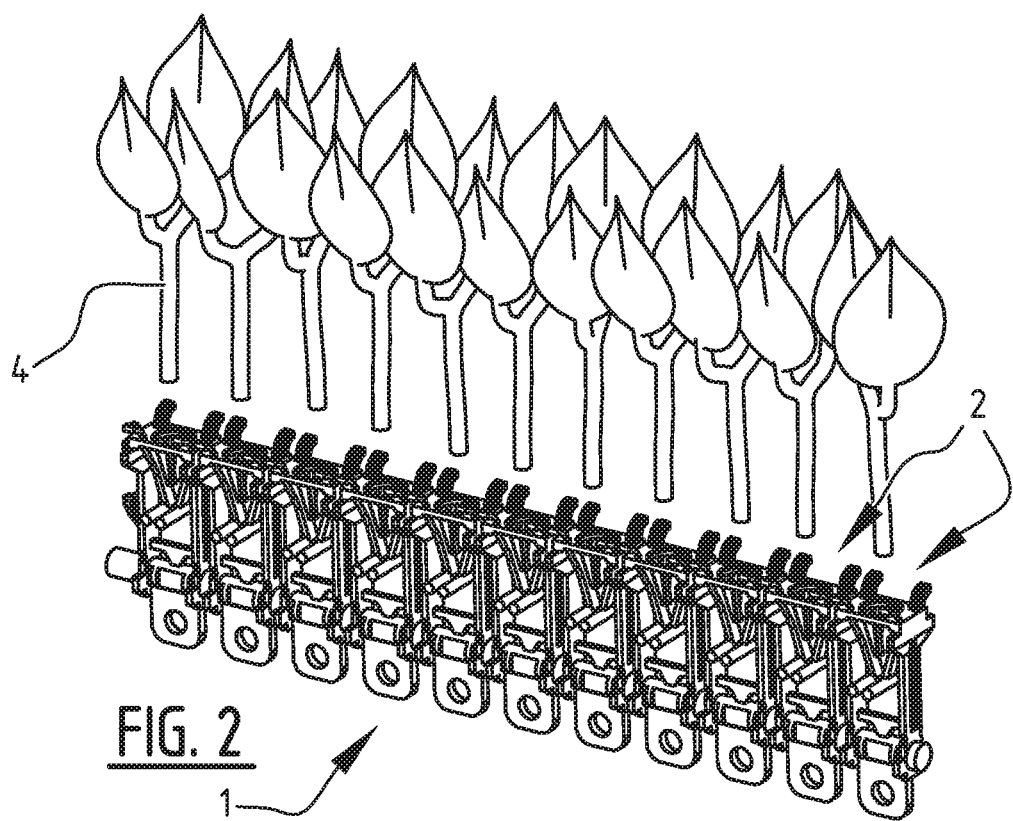
FIG. 2 is a perspective view of a plant holder comprising eleven cells.

Plant holder 1 according to the invention comprises at least one cell 2 which defines a plant position 3 and which is configured to receive plant material 4 during use. Shown in FIG. 1 is a single cell 2, while FIG. 2 shows a plant holder 1 comprising eleven connected cells 2. Plant holder 1 further comprises a clamp 5, comprising a clamping position (FIG. 10), in which plant material 4 can be clamped in cell 2, and an open position (FIGS. 8 and 9) in which plant material is to be arranged in and/or removed from clamp 5. Clamp 5 is provided with at least one actuator 6 which is configured to be engaged externally in order to open clamp 5.

Actuator 6 preferably extends from clamp 5 to a location outside plant position 3. It hereby becomes relatively simple to engage actuator 6 while plant position 3 is simultaneously kept substantially clear. Plant material 4 can then be arranged unimpeded in the held-open clamp 5 at plant position 3.

Clamp 5 of plant holder 1 preferably comprises at least one resilient arm 7. In FIG. 1 plant holder 1 comprises two resilient arms 7 which are arranged diametrically opposite each other and between which plant material 4 can be clamped.

Figure 3:
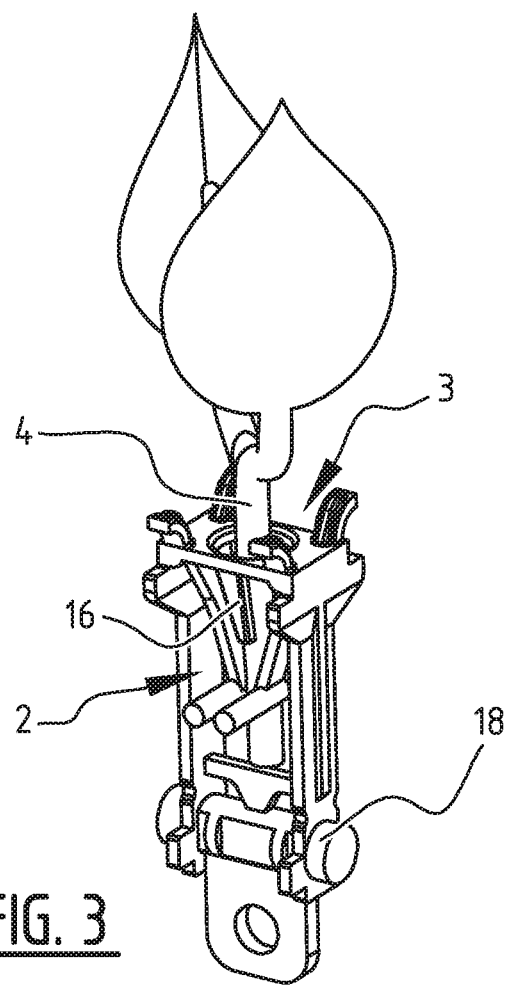
FIG. 3 is a perspective view of a cell with plant material arranged therein.
Figure 4:
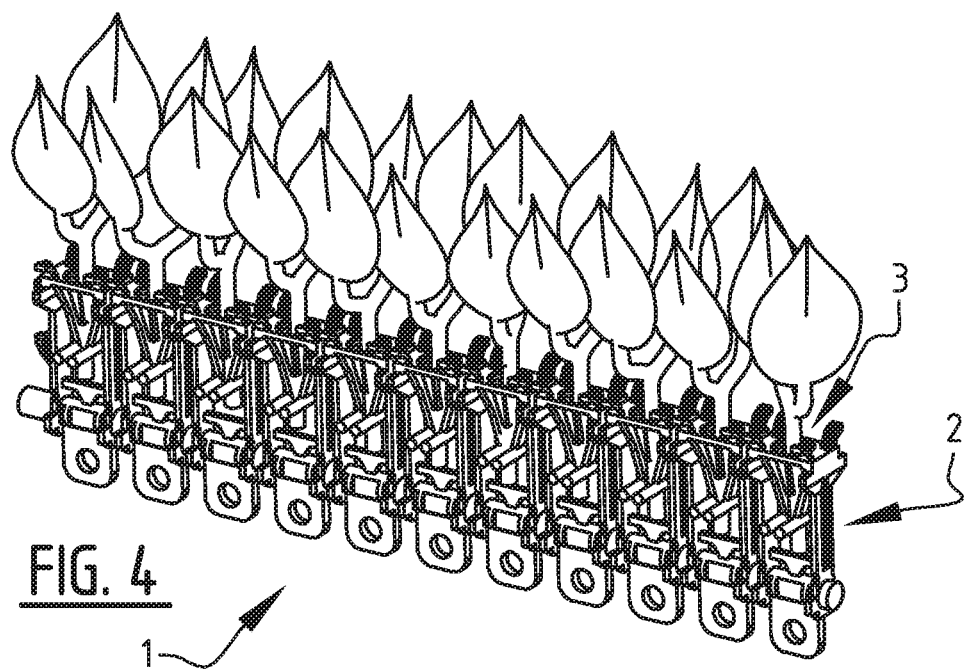
FIG. 4 is a perspective view of a plant holder according to FIG. 2 with plant material arranged therein.
Figure 7:
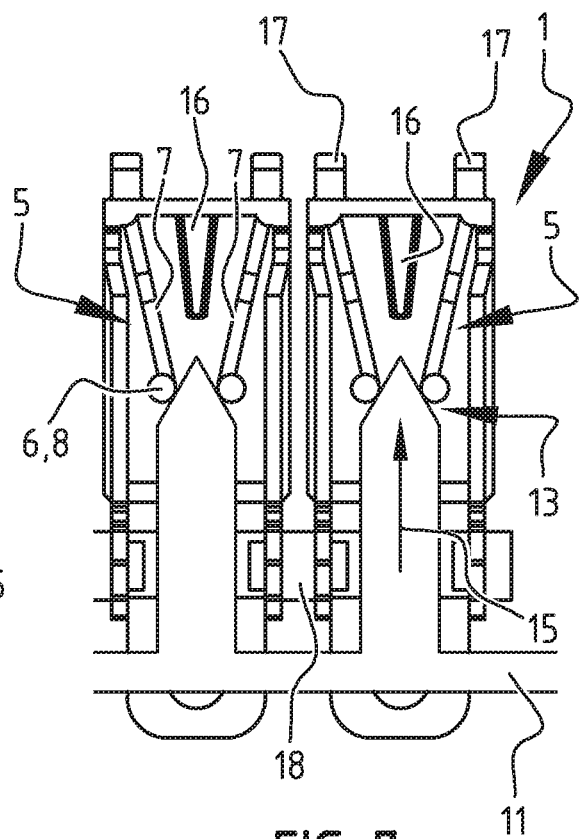

Actuator 6 comprises a leg 8 extending from the at least one resilient arm 7. In the shown embodiment leg 8 extends transversely relative to arm 7 to a location outside plant position 3. Shown in FIG. 3 is a situation in which plant material 4 is clamped in plant position 3 between resilient arms 7 of clamp 5. Legs 8 of actuator 6 extending transversely of resilient arms 7 are located outside the plant position 3, and are thereby readily accessible for engagement, for instance by an external spreader 11 (FIGS. 7-9).

Figure 5:
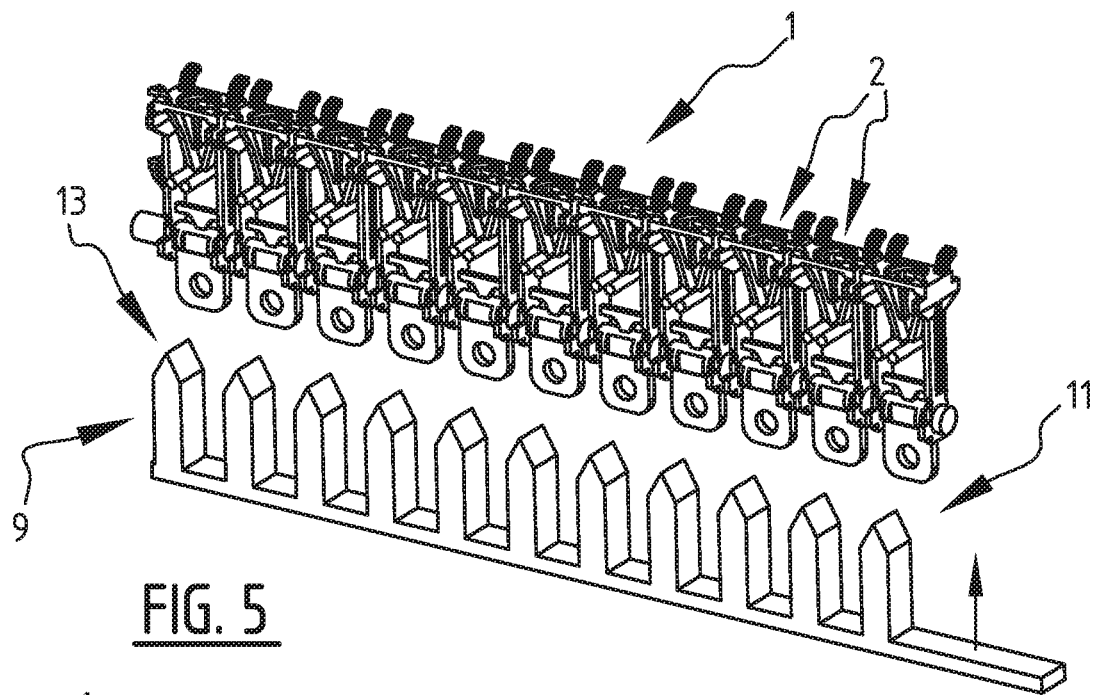
FIG. 5 is a perspective view of a system according to the invention.

Provided according to a preferred embodiment of the invention is a system 9 comprising a feed 10 of one or more than one plant holder 1. Supplied in FIG. 5 is a plant holder 1 according to FIG. 2 with eleven cells 2. System 9 further comprises a spreader 11 with which the at least one actuator 6 is engageable in order to open clamp 5, and an inserting device and/or removing device 12 configured to arrange plant material 4 in clamp 5 or remove it therefrom. The inserting device and removing device can comprise the same element 12.

In the shown embodiment clamp 5 comprises at least two resilient arms 7 which are each provided with at least one actuator 6, and spreader 11 is configured to push apart the at least two resilient arms 7. In FIGS. 7-9 spreader 11 pushes resilient arms 7 apart so that plant material 4 can be arranged in clamp 5 (FIG. 9).

When spreader 11 is wedge-shaped, it can be pushed into a narrow space between two actuators 6 (FIGS. 6 and 7) and subsequently spreads apart resilient arms 7 of clamp 5 (FIGS. 8 and 9).

A particularly compact embodiment results when spreader 11 is arranged movably in a direction 15 substantially parallel to a direction of arrangement 14 or direction of removal of plant material 4. The direction of removal (not shown) of plant material 4 is opposite to the direction of arrangement 14.

Figure 6:
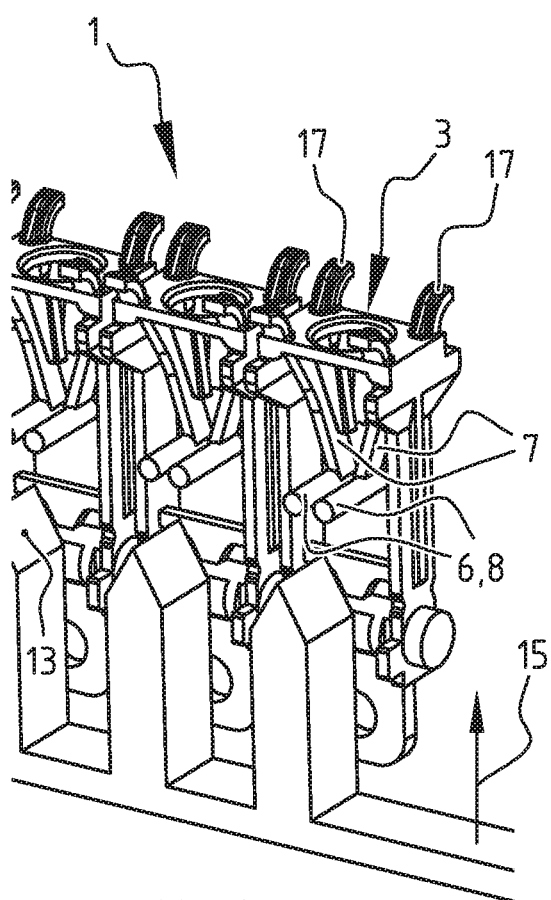

Spreader 11 is movable laterally along plant position 3 and is engageable adjacently of plant position 3 with the at least one actuator 6. Shown clearly in the perspective view of FIG. 6 is that legs 8 of actuator 6 extend transversely relative to resilient arms 7 to a location adjacently of plant position 3.

The method for processing a plant holder 1 comprising a clamp 5 comprises the steps of opening clamp 5 (FIGS. 7 and 8), arranging plant material 4 in and/or removing it from clamp 5 (FIG. 9), and closing clamp 5 (FIG. 10).

Opening of clamp 5 takes place by externally engaging an actuator 6 arranged on clamp 5. By actively opening clamp 5 there is less of an impact on the plant material 4 when it is arranged in or removed from clamp 5. Also prevented is that clamp 5 is fully opened by plant material 4 to be arranged therein, which would have an impact on plant material 4 and could damage it.

FIGS. 7 and 8 show the step of engaging the actuator 6 with a spreader 11, which in the shown embodiment is wedge-shaped 13. This wedge shape 13 allows spreader 11 to be placed between two actuators 6. These actuators 6 are preferably connected via legs 8 to resilient arms 7 of clamp 5, wherein legs 8 position actuators 6 away from plant position 3 in cell 2. It hereby becomes relatively easily possible to engage actuator 6 with spreader 11 while simultaneously keeping plant position 3 substantially clear. Plant material 4 can then be arranged unimpeded at plant position 3 in the held-open clamp 5, or if desired removed therefrom. The step of opening clamp 5 is followed by a further step of arranging plant material 4 in clamp 5 (FIG. 9).

The direction of movement 15 of spreader 11 is indicated with arrows in FIGS. 6-10. Moving the spreader 11 in a direction substantially parallel to a direction of arrangement or removal of plant material 4 enables system 9 to be constructed in compact manner.

It is moreover preferred that the method comprises the step of moving spreader 11 laterally along plant position 3 and engaging spreader 11 laterally with actuator 6 for the purpose of opening clamp 5. Because of this lateral direction of movement 15 the resilient arms 7 are loaded in the direction of arrangement or removal of plant material 4. Should the actuator be engaged from a direction transversely of the direction of arrangement or removal of plant material 4, this would then result in an undesirable transverse load on resilient arms 7 of clamp 5. Resilient arms 7 would have to be given a heavier form in order to prevent an undesired transverse displacement thereof, whereby use of material and mass would increase.

Figure 12:
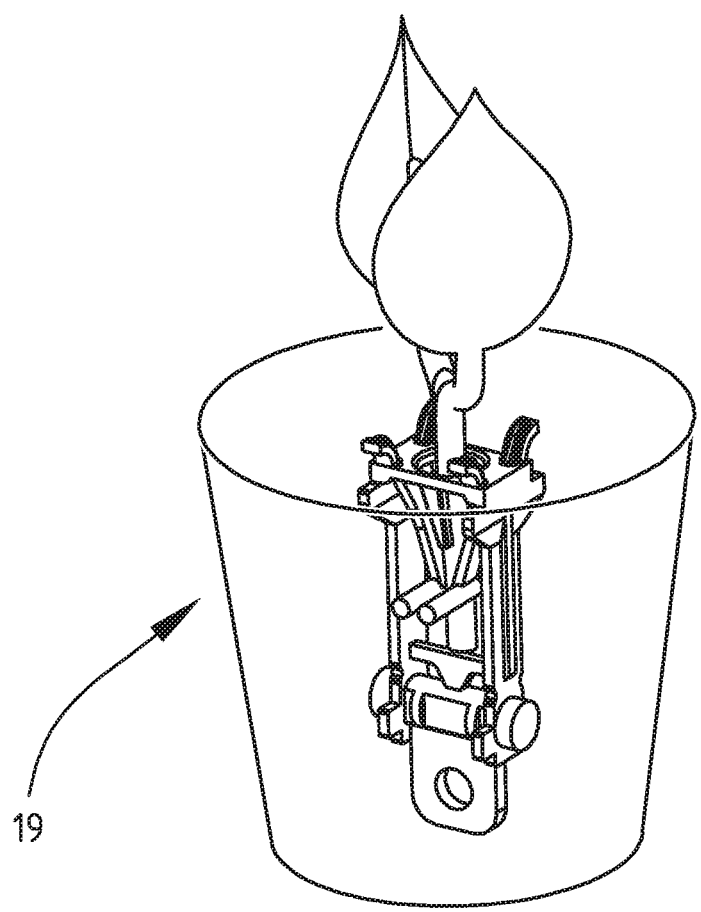
FIG. 12 is a schematic view of the system wherein a cell with plant is removed from the plant holder and placed in a pot.

System 9 shown in FIG. 11 shows how an inserting device 12 configured for arranging plant material 4 in clamp 5 arranges three plant cuttings at a time in cells 2 of plant holder 1. A spreader 11 is provided which can simultaneously spread clamps 5 of a corresponding number of three cells 2. Cells 2 are unified via a rail 18 to form a plant holder 1. After the plant cuttings have grown large enough, a cell 2 with plant received therein in plant position 3 can be removed from plant holder 1, for instance by a breaking, cutting or clipping operation. The plants singulated in this manner can then be transplanted into larger pots 19 for a further growth phase (FIG. 12).

Although it shows a preferred embodiment of the invention, the above described embodiment is intended solely for the purpose of illustrating the present invention and not to limit the scope of the invention in any way. When measures in the claims are followed by reference numerals, such reference numerals serve only to contribute toward understanding of the claims, but are in no way limitative of the scope of protection. The described rights are defined by the following claims, within the scope of which many modifications can be envisaged.

The invention claimed is:

1. A plant holder system, comprising:
a plant holder comprising at least one cell that defines a plant position and that is configured to receive plant material along a direction of arrangement during use, the plant holder comprising a clamp that comprises a base having an opening, a first resilient arm, a second resilient arm, and an actuator, wherein the first resilient arm and second resilient arm are mounted to the base, and are configured to pivot about a first pivot axis and second pivot axis, respectively, when moving between a clamping position and an open position of the clamp, wherein the actuator comprises a first leg extending from the first resilient arm, and a second leg extending from the second resilient arm, wherein the first and second legs are each elongated along a direction that is perpendicular to said direction of arrangement and each extend to a location outside the plant position; and
a spreader configured to engage the actuator for bringing the clamp from the clamping position to the open position by pushing apart the first and second legs thereby spreading apart the first and second resilient arms;
wherein the spreader and the actuator are relatively moveable between a non-engaged state, wherein the spreader is not engaged with the actuator, and an engaged state, wherein the spreader is engaged with the actuator;
wherein the first pivot axis and second pivot axis are spaced apart from each other and are arranged perpendicular to said direction of arrangement, and wherein the opening in the base is arranged between the first pivot axis and the second pivot axis;
wherein in the open position the plant material can be received between the first and second resilient arms through the opening in the base, or plant material can be removed from the clamp through the opening in the base; and
wherein in the clamping position the first resilient arm and the second resilient arm extend longitudinally toward each other as seen along the direction of arrangement for the purpose of clamping the plant material therebetween.

2. A plant holder, comprising:
at least one cell that defines a plant position and that is configured to receive plant material along a direction of arrangement during use;
the plant holder comprising a clamp comprising a base having an opening, a first resilient arm, a second resilient arm, and an actuator, wherein the first resilient arm and the second resilient arm are mounted to the base and are configured to pivot about a first pivot axis and a second pivot axis, respectively, when moving between a clamping position and an open position of the clamp, wherein the actuator comprises a first leg extending from the first resilient arm, and a second leg extending from the second resilient arm, wherein the first and second legs each extend to a location outside the plant position;

wherein the actuator is configured to be engaged by a spreader for the purpose of bringing the clamp from the clamping position to the open position by having the first and second legs pushed apart by the spreader, thereby spreading apart the first and second resilient arms;

wherein the first pivot axis and the second pivot axis are spaced apart from each other and are arranged perpendicular to said direction of arrangement and wherein the opening in the base is arranged in between the first pivot axis and the second pivot axis;

wherein, in the open position, plant material can be received in between the first and second resilient arms through the opening in the base, or plant material can be removed from the clamp through the opening in the base; and wherein, in the clamping position, the first resilient arm and the second resilient arm extend longitudinally towards each other as seen along the direction of arrangement for the purpose clamping the plant material therebetween.

3. The plant holder system according to claim 1, wherein the spreader is configured to be moved parallel to the direction of arrangement for the purpose of engaging the actuator.

* * * * *